United States Patent
Gu et al.

(10) Patent No.: US 11,387,053 B2
(45) Date of Patent: *Jul. 12, 2022

(54) ARAMID FIBER ELECTRODE AND PREPARATION METHOD THEREFOR

(71) Applicant: SOOCHOW UNIVERSITY, Suzhou (CN)

(72) Inventors: Aijuan Gu, Suzhou (CN); Hao Fang, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 284 days.

This patent is subject to a terminal disclaimer.

(21) Appl. No.: 16/759,330

(22) PCT Filed: Jul. 4, 2018

(86) PCT No.: PCT/CN2018/094571
§ 371 (c)(1),
(2) Date: Apr. 25, 2020

(87) PCT Pub. No.: WO2020/006719
PCT Pub. Date: Jan. 9, 2020

(65) Prior Publication Data
US 2020/0286691 A1    Sep. 10, 2020

(51) Int. Cl.
*H01G 11/36* (2013.01)
*D06M 11/83* (2006.01)
(Continued)

(52) U.S. Cl.
CPC ............. *H01G 11/36* (2013.01); *D06M 11/74* (2013.01); *D06M 11/83* (2013.01); *D06M 13/11* (2013.01);
(Continued)

(58) Field of Classification Search
CPC ........ H01G 11/36; H01G 11/24; H01G 11/40; H01G 11/86; D06M 11/74; D06M 11/83;
(Continued)

(56) References Cited

FOREIGN PATENT DOCUMENTS

| CN | 102277728 A | 12/2011 |
| CN | 105839402 A | 8/2016 |

(Continued)

OTHER PUBLICATIONS

Sa et al. "Surface Modification of Aramid Fibers by Bio-Inspired Poly(dopamine) and Epoxy Functionalized Silane Grafting" ACS Applied Materials & Interfaces, vol. 6, Nov. 17, 2014, pp. 21730-21738.

Primary Examiner — Robert S Walters, Jr.
(74) *Attorney, Agent, or Firm* — SZDC Law P.C.

(57) ABSTRACT

The invention discloses an aramid fiber electrode and a preparation method thereof. Silver nanoparticles, carbon nanotubes and polypyrrole were sequentially coated on the surface of the aramid fiber by chemical bonding, to prepare an aramid fiber electrode, two aramid fiber electrodes were wound with an electrolyte to obtain an aramid fiber electrochemical capacitor. Compared with the polymer fiber electrochemical capacitor prepared in the prior art, the aramid fiber electrochemical capacitor provided by the present invention has both high specific capacitance, high energy density, high mechanical performance, high stability, good flexibility and wearability. And other characteristics; the preparation method is controllable and suitable for large-scale applications.

11 Claims, 9 Drawing Sheets

(51) Int. Cl.
*H01G 11/24* (2013.01)
*H01G 11/40* (2013.01)
*H01G 11/86* (2013.01)
*D06M 11/74* (2006.01)
*D06M 13/11* (2006.01)
*D06M 15/61* (2006.01)
*D06M 13/513* (2006.01)
*D06M 15/37* (2006.01)
*D06M 23/08* (2006.01)

(52) U.S. Cl.
CPC .......... *D06M 13/513* (2013.01); *D06M 15/37* (2013.01); *D06M 15/61* (2013.01); *D06M 23/08* (2013.01); *H01G 11/24* (2013.01); *H01G 11/40* (2013.01); *H01G 11/86* (2013.01)

(58) Field of Classification Search
CPC .... D06M 13/11; D06M 13/513; D06M 15/37; D06M 15/61; D06M 23/08
See application file for complete search history.

(56) References Cited

FOREIGN PATENT DOCUMENTS

| | | |
|---|---|---|
| CN | 106436306 A | 2/2017 |
| CN | 107313257 A | 11/2017 |
| KR | 20170057610 A | 5/2015 |

ARAMID FIBER ELECTRODE AND PREPARATION METHOD THEREFOR

This application is the National Stage Application PCT/CN2018/094571, filed on Jul. 4, 2018, which is incorporated by reference for all purposes as if fully set forth herein.

TECHNICAL FIELD

The present invention relates to a fiber electrode, an electrochemical capacitor and a preparation method thereof, and in particular to an aramid fiber electrode and preparation method thereof.

BACKGROUND TECHNIQUE

With the rapid development of flexible and wearable smart devices and the urgent need for sustainable energy, fibrous electrochemical capacitors with high energy-storage density are small, light-weight, flexible, efficient and easy to integration, and thus exhibiting great application potential. Fibrous electrochemical capacitors are composed of fibre electrodes and electrolyte in parallel, twisted or coaxial configurations, so their properties are greatly dependent on those of electrode materials. To promote fibrous electrochemical capacitors from concept to application, high performance fibre electrodes are needed to be developed, which should not only have outstanding electrochemical properties, but also own good flexibility and wearability simultaneously.

Up to date, a variety of fibres have been reported to prepare fibre electrodes. Carbon fibres are brittle and thus cannot be bent frequently and easily weaved. Metal fibres (such as stainless steel fibres, nickel fibres, etc.) are ductile but with inherent rigidity and plasticity. Graphene and carbon nanotube fibres are still not applicable in large scale due to their high price. Polymeric fibres are regarded to be right candidate for preparing wearable fibrous electrodes at present owing to their high flexibility.

However, the existing polymer fiber electrodes and their capacitors have three bottlenecks. First, the conductivity of the electrode is low, leading to low energy density. Polymer fibers are generally coated with carbon materials (such as carbon nanotubes, graphene, etc.), conductive polymers (such as polyaniline, polypyrrole, etc.) or transition metal oxides (such as manganese dioxide, zinc oxide, etc.) to obtain capacitive performance. However, even though these materials were formed on polymeric fibres, polymeric fibres make no contribution to capacitive properties, so the specific capacitance of polymeric fibre electrodes and the energy density of capacitors are generally low. Second, the adhesion between the inorganic coating and the fiber matrix is poor. After multiple deformation or electrochemical cycling, the coating may fall off and cause performance degradation, resulting in poor wearability of the fiber capacitors. Third, the mechanical properties of existing polymer fiber capacitors have not yet reached the requirements. At present, polyester fiber, polyamide fiber, polyurethane fiber, cotton fiber, etc. are usually used as the matrix of polymer fiber capacitors, their tensile properties are usually very low, mainly meeting the applications in daily life, but they are not suitable to be used in areas with high requirements on mechanical properties such as bulletproof products.

Therefore, developing polymer fiber capacitors having excellent electrochemical performance, good flexibility and wearability is still a challenge. Among polymer fibers, aramid fiber has excellent mechanical properties, thermal properties and chemical resistance, and thus receiving great attention since its birth. However, like other polymer fiber capacitors, aramid fiber capacitors also have two problems, their capacitance performance as well as their adhesion with the inorganic coating remain to be solved. Developing aramid fiber capacitors with excellent electrochemical performance, mechanical properties, good flexibility and wearability have important application values.

SUMMARY OF THE INVENTION

In order to overcome the shortcomings of the prior art, an object of the present invention is to provide aramid fiber electrodes and electrochemical capacitors with high specific capacitance, high energy density, high mechanical properties, high stability, good flexibility and wearability, moreover, the preparation method is suitable for large-scale applications.

Technical Solution

The technical solution to achieve the object of the present invention is:

A method for preparing aramid fiber electrodes includes the following steps:

(1) The aramid fiber bundles are immersed in an aqueous solution containing dopamine hydrochloride and trimethylolaminomethane hydrochloride, through reaction, polydopamine-coated aramid fiber bundles are obtained;

(2) Polyvinylpyrrolidone is added into silver ammonia solution to obtain solution C, followed by adding polydopamine-coated aramid fiber bundles into the solution; after that an aqueous glucose solution is added dropwise, through reaction aramid fiber bundles coated with silver nanoparticles are obtained;

(3) Aramid fiber bundles coated with silver nanoparticles are added into an aqueous solution containing γ-(2,3-glycidoxy) propyltrimethoxysilane, through reaction, aramid fiber bundles coated by silver nanoparticles with epoxy groups on the surface are obtained;

(4) Aramid fiber bundles coated by silver nanoparticles with epoxy groups on the surface are added into ethanol containing carbon nanotubes with carboxyl groups. Through reaction, aramid fiber bundles with double-layered coatings of carbon nanotubes and silver nanoparticles are obtained;

(5) Aramid fiber bundles with double-layered coatings of carbon nanotubes and silver nanoparticles were added into an aqueous solution containing pyrrole, and then silver nitrate aqueous solution was added dropwise, through reaction, aramid fiber electrodes are obtained.

A method for preparing aramid fiber bundles with double-layered coatings of carbon nanotubes and silver nanoparticles includes the following steps:

(1) Aramid fiber bundles are immersed in an aqueous solution containing dopamine hydrochloride and trimethylolaminomethane hydrochloride, through reaction, polydopamine-coated aramid fiber bundles are obtained;

(2) Polyvinylpyrrolidone is added into silver ammonia solution to obtain solution C, followed by adding polydopamine-coated aramid fiber bundles into the solution; after that an aqueous glucose solution is added dropwise, through reaction an aramid fiber bundles coated with silver nanoparticles are obtained;

(3) Aramid fiber bundles coated with silver nanoparticles are added into an aqueous solution containing γ-(2,3-glycidoxy) propyltrimethoxysilane, through reaction, aramid fiber bundles coated with silver nanoparticles with epoxy groups on the surface are obtained;

(4) Aramid fiber bundles coated by silver nanoparticles with epoxy groups on the surface are added into ethanol containing carbon nanotubes with carboxyl groups. Through reaction, aramid fiber bundles with double-layered coatings of carbon nanotubes and silver nanoparticles are obtained;

In the above technical solution, wherein in step (1), the mass ratio of dopamine hydrochloride, TRIS-HCl and polydopamine-coated aramid fiber bundles is (0.1 to 1):(0.05 to 0.5):(0.1 to 1); in step (2), the mass ratio of silver nitrate, polyvinylpyrrolidone, glucose and polydopamine coated aramid fiber bundles is (0.5-5):(0.05-0.5):(1-10):(0.1-1); in step (3), the mass ratio of γ-(2,3-epoxypropoxy) propyl trimethoxy silicon alkane and aramid fiber bundles coated with silver nanoparticles is (0.5-5):(0.1-1); in step (4), the mass ratio of carbon nanotubes with carboxyl groups to aramid fiber bundles coated with silver nanoparticles containing epoxy groups is (0.5-5):(0.1-1).

In the above technical solution, wherein in step (1), pH value of the aqueous solution containing dopamine hydrochloride and trimethylolaminomethane hydrochloride was 8.5, the reaction is carried out with shaking at room temperature for 5 to 48 hours; in step (2), the reaction is a shaking reaction at room temperature for 10 to 60 min; in step (3), the reaction is a shaking reaction at 50 to 100° C. for 1 to 10 hours; in step (4), the reaction is a shaking reaction at 50 to 80° C. for 5 to 24 hours.

In the above technical solution, wherein in step (1), after the reaction is finished, the fibers are taken out, washed and dried to obtain polydopamine coated aramid fiber bundles; in step (2), after the reaction is finished, the fibers are taken out, washed and dried to obtain aramid fiber bundles coated with silver nanoparticles; in step (3), after the reaction is finished, the fibers are taken out, washed and dried to obtain aramid fiber bundles coated by silver nanoparticles with epoxy groups on the surface; in step (4), after the reaction is finished, the fibers are taken out, washed and dried to obtain aramid fiber bundles with double-layered coatings of carbon nanotubes and silver nanoparticles.

In the above technical solution, the aramid fibers are polyparaphenylene terephthalamide fibers, isophthaloyl metaphenylene diamine fibers, polyparabenamide fibers, or a combination thereof; the carbon nanotubes include multi-walled carbon nanotubes, single-walled carbon nanotubes, and carbon nanotube bundles, or a combination thereof.

In the above technical solution, wherein in step (5), the mass ratio of silver nitrate, pyrrole, and aramid fiber bundles coated with carbon nanotubes and silver nanoparticles is (0.2~4):(0.1~2):(0.1~1); the reaction is carried out at room temperature for 5 to 48 hours with shaking; after the reaction is finished, the fibers are taken out, washed and dried to obtain aramid fiber electrode.

The aramid fiber electrode prepared according to the preparation method disclosed in the present invention, the aramid fiber bundles with double-layered coatings of carbon nanotubes and silver nanoparticles prepared according to the preparation method disclosed in the present invention. Applications of aramid fiber bundles with double-layered coatings of carbon nanotubes and silver nanoparticles in preparing aramid fiber electrodes prepared according to the preparation method disclosed in the present invention.

The aramid fiber electrode disclosed in the present invention and the preparation method thereof can be performed as follows, according to the mass ratio:

(1) 0.1 to 1 part of dopamine hydrochloride and 0.05 to 0.5 part of trimethylolaminomethane hydrochloride were dissolved in 100 mL of water to obtain solution A; 0.1 to 10 part of sodium hydroxide was dissolved in 100 mL of water to obtain an aqueous solution of sodium hydroxide; an aqueous solution of sodium hydroxide was used to adjust the pH value of solution A to 8.5 to obtain solution B; 0.1 to 1 part of aramid fiber bundles were immersed in solution B, followed by shaking at room temperature for 5 to 24 hours; after the reaction was complete, the fibers were taken out, washed and dried to obtain poly dopamine-coated aramid fiber bundles;

(2) 0.5 to 5 part of silver nitrate was dissolved in 50 mL of water, followed by adding dropwise ammonia water until the silver ammonia solution is clarified again, and the 0.05 to 0.5 part of polyvinylpyrrolidone was added to obtain solution C; 1 to 10 part of glucose was dissolved in 50 mL of water to obtain a glucose aqueous solution; 0.1 to 1 part of polydopamine-coated aramid fiber bundles was added to solution C, and the solution was shaken at room temperature while the glucose aqueous solution was added dropwise, and then the reaction was processed at room temperature for 10 to 60 min with continue shaking; after the reaction, the fibers are taken out, washed and dried to obtain aramid fiber bundles coated with silver nanoparticles.

(3) 0.5 to 5 part of γ-(2,3-glycidoxy) propyltrimethoxysilane was added to 100 mL of water, into which 0.1 to 1 part of polydopamine and silver nanoparticles coated aramid fiber bundles were then added, the reaction was taken place with shaking at 50 to 100° C. for 1 to 10 hours; after the reaction was completed, the fibers were taken out, washed and dried to obtain aramid fiber bundles coated by silver nanoparticles with epoxy groups on the surface;

(4) 0.5 to 5 part of multi-walled carbon nanotubes with carboxyl groups were added to 80 mL of ethanol, and then 0.1 to 1 part of aramid fiber bundles coated by silver nanoparticles with epoxy groups on the surface were added, the reaction was taken place with shaking at 50° C. for 5 to 24 hours; after the reaction was completed, the fibers were taken out, washed and dried to obtain aramid fiber bundles with double-layered coatings of carbon nanotubes and silver nanoparticles;

(5) 0.2 to 4 part of silver nitrate were dissolved in 50 mL water to obtain silver nitrate aqueous solution; 0.1 to 2 part of pyrrole were added into 50 mL water, followed by adding 0.1 to 1 part of aramid fiber bundles with double-layered coatings of carbon nanotubes and silver nanoparticles, and then the whole reactor was shaken at room temperature, and silver nitrate aqueous solution was added at the same time, and then the reaction was processed at room temperature for 5 to 48 hours with shanking; after the reaction was complete, the fibers were taken out, washed and dried to obtain aramid fiber bundles with three-layered coatings of polypyrrole, carbon nanotubes and silver nanoparticles, they are aramid fiber electrodes;

Beneficial Effects

Compared with the prior art, the beneficial effects obtained by the present invention are:

1. The present invention designs a composite coating layer of silver, carbon nanotubes and polypyrrole, which combines the high capacitance of polypyrrole with high electrical conductivity of silver and carbon nanotubes, besides there is a synergistic effect between silver and carbon nanotubes, the obtained electrochemical capacitor has high excellent electrochemical performances such as specific capacitance and high energy density.

2. The present invention generates a coating layer on the surface of the aramid fiber through hybridization and composite technology; there is chemical action between the coating layer and the fiber, the presence of silver and carbon nanotubes can prevent the structure of polypyrrole from being destroyed, and the obtained electrochemical capacitor has high stability and good wearability.

3. The present invention uses aramid fiber as the matrix of the fiber electrochemical capacitor, so fiber electrochemical capacitors with good flexibility, high tensile strength and tensile modulus are obtained.

DETAILED DESCRIPTION

The technical solution of the invention will be further described in combination with the drawings, embodiments and comparative examples.

Figure 8:
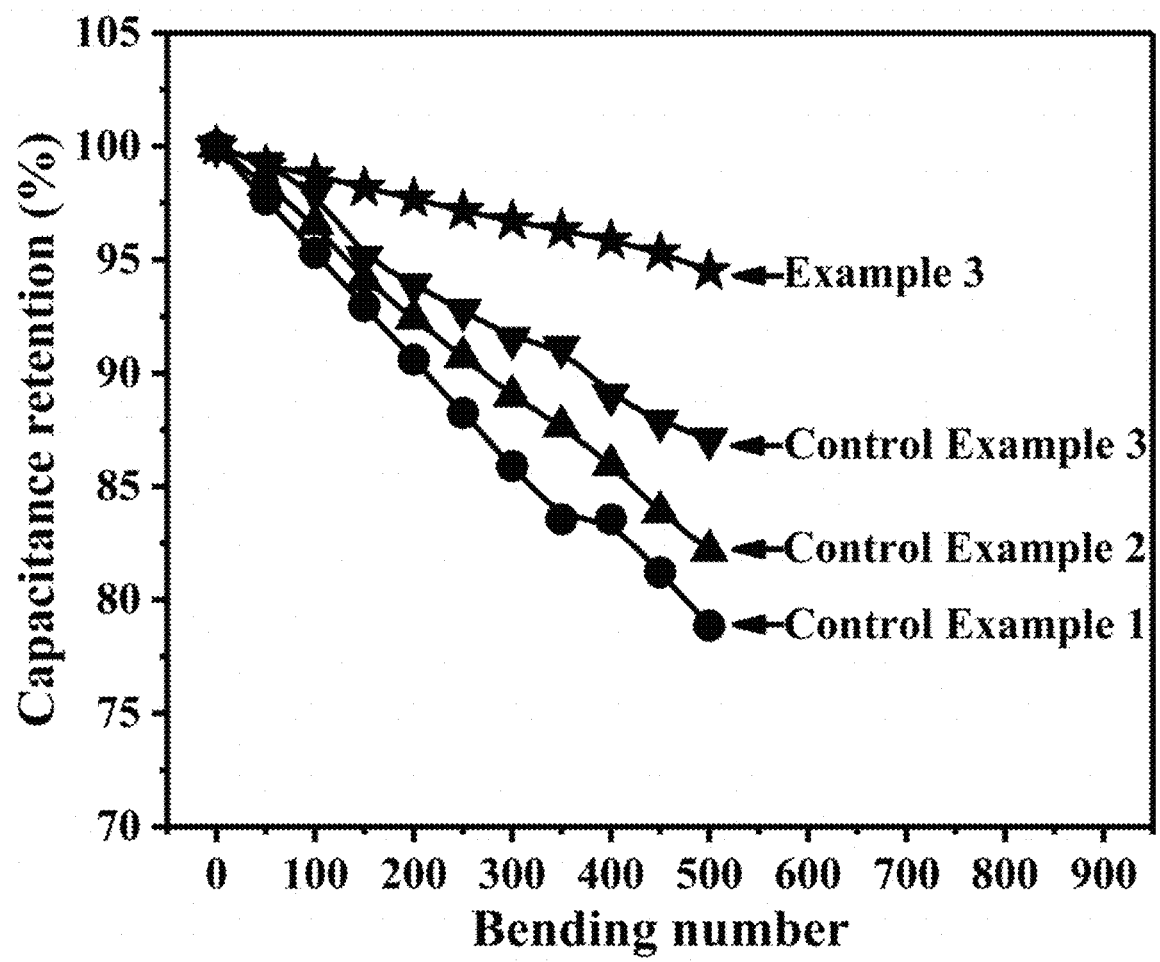
FIG. 8 is the retention ratios of the capacitance of the aramid fiber electrochemical capacitors after 90° bending at different times provided by Comparative Example 1, Comparative Example 2, Comparative Example 3, and Example 3.

Comparative Example 1 Preparation of Polypyrrole-Coated Aramid Fiber and Capacitor (1) 0.85 g silver nitrate was dissolved in 50 mL water to obtain carbon nanotube and silver nitrate aqueous solution; 0.67 g pyrrole was added into 50 mL water, followed by adding 0.5 g of poly(p-benzoyl-p-phenylenediamine) fibers, and then the whole reactor was shaken at room temperature, and silver nitrate aqueous solution was added at the same time, and then the reaction was processed at room temperature for 24 hours with shanking; after the reaction is complete, the fibers are removed, washed, and dried to obtain aramid fiber bundles coated with polypyrrole and carbon nanotubes;

(2) 10 g of polyvinyl alcohol, 10 g of phosphoric acid and 100 mL of water were heated at 90° C. for 5 h, and the cooled down to obtain a polyvinyl alcohol gel;

(3) Two polypyrrole-coated aramid fiber bundles were immersed in a polyvinyl alcohol gel, and then taken out and twist them together, the gel was solidified at room temperature to obtain an aramid fiber electrochemical capacitor. Its histograms of length specific capacitance, volumetric specific capacitance and gravimetric specific capacitance are provided in FIG. 5S, its histograms of length energy density, volumetric energy density and gravimetric energy density are provided in FIG. 6, its capacitance retentions after different 900 bending times of aramid fiber electrochemical capacitor are shown in FIG. 8.

Comparative Example 2 Preparation of Aramid Fiber Coated with Double Layers of Polypyrrole and Silver Nanoparticles and Capacitor (1) 0.2 g of dopamine hydrochloride and 0.16 g of trimethylolaminomethane hydrochloride were dissolved in 100 mL of water to obtain solution A; 2 g of sodium hydroxide was dissolved in 100 mL of water to obtain an aqueous solution of sodium hydroxide; an aqueous solution of sodium hydroxide was used to adjust the pH value of solution A to 8.5 to obtain solution B; 0.5 g of polyparaphenylene terephthalamide fiber bundles were immersed in solution B, followed by shaking at room temperature for 24 hours; after the reaction is complete, the fibers were taken out, washed and dried to obtain polydopamine-coated aramid fiber bundles;

(2) 1.5 g of silver nitrate was dissolved in 50 mL of water, followed by adding dropwise ammonia water until the silver ammonia solution is clarified again, and the 0.25 g of polyvinylpyrrolidone was added to obtain solution C; 3 g of glucose was dissolved in 50 mL of water to obtain a glucose aqueous solution; 0.5 g of polydopamine-coated aramid fiber bundles was added to solution C, and the solution was shaken at room temperature while the glucose aqueous solution was added dropwise, and then the reaction was processed at room temperature for 30 min with continue shaking; after the reaction, the fibers are taken out, washed and dried to obtain aramid fiber bundles coated with silver nanoparticles;

(3) 0.85 g silver nitrate was dissolved in 50 mL water to obtain silver nitrate aqueous solution; 0.67 g pyrrole was added into 50 mL water, followed by adding 0.5 g of silver nanoparticle-coated aramid fiber bundles, and then the whole reactor was shaken at room temperature, and silver nitrate water-soluble was added at the same time, and then the reaction was processed at room temperature for 24 hours with shanking; after the reaction was complete, the fibers were taken out, washed and dried to obtain aramid fiber bundles with two-layered coatings of polypyrrole and silver nanoparticles;

(4) 10 g of polyvinyl alcohol, 10 g of phosphoric acid and 100 mL of water were heated at 90° C. for 5 h, and the cooled down to obtain a polyvinyl alcohol gel;

(5) Two aramid fiber bundles with two-layered coatings of polypyrrole and silver nanoparticles were immersed in a polyvinyl alcohol gel, and then the fibers were taken out and entangled together, the gel was solidified at room temperature to obtain an aramid fiber electrochemical capacitor. Its histograms of length specific capacitance, volumetric specific capacitance and gravimetric specific capacitance are provided in FIG. 5S, its histograms of length energy density, volumetric energy density and volumetric and gravimetric energy densities energy density are provided in FIG. 6, its capacitance retentions after different 900 bending times of aramid fiber electrochemical capacitor are shown in FIG. 8.

Comparative Example 3 Preparation of Aramid Fibers with Two-Layered Coatings of Polypyrrole and Carbon Nanotubes and Preparation of Capacitor (1) 0.2 g of dopamine hydrochloride and 0.16 g of trimethylolaminomethane hydrochloride were dissolved in 100 mL of water to obtain solution A; 2 g of sodium hydroxide in 100 mL of water was dissolved to obtain an aqueous solution of sodium hydroxide; an aqueous solution of sodium hydroxide was used to adjust the pH value of solution A to 8.5 to obtain solution B; 0.5 g of polyparaphenylene terephthalamide fiber bundles were immersed in solution B, and then the reaction was carried out with shaking at room temperature for 24 hours; after the reaction is complete, the fibers were taken out, washed and dried to obtain polydopamine-coated aramid fiber bundles;

(2) 2.5 g of γ-(2,3-glycidoxy) propyltrimethoxysilane was added to 100 mL of water, into which 0.5 g of polydopamine-coated aramid fiber bundles were then added, the reaction was taken place with shaking at 65° C. for 5 h; after the reaction was completed, the fibers were taken out, washed and dried to obtain aramid fiber bundles with epoxy groups on the surface;

(3) 1 g of multi-walled carbon nanotubes with carboxyl groups were added to 100 mL of ethanol, and then 0.5 g of aramid fiber bundles coated with silver nanoparticles with epoxy groups on the surface were then added, the reaction was taken place with shaking at 70° C. for 12 h; after the reaction was completed, the fibers were taken out, washed and dried to obtain aramid fiber bundles with carbon nanotubes;

(4) 0.85 g silver nitrate was dissolved in 50 mL water to obtain carbon nanotube and silver nitrate aqueous solution; 0.67 g pyrrole was added into 50 mL water, followed by adding 0.5 g of aramid fiber bundles with double-layered coating of silver nanoparticle carbon nanotubes, and then the whole reactor was shaken at room temperature, and silver nitrate solution was added at the same time, and then the reaction was processed at room temperature for 24 hours with shanking; after the reaction is complete, the fibers are removed, washed, and dried to obtain aramid fiber bundles with two-layered coatings of polypyrrole and carbon nanotubes;

(5) 10 g of polyvinyl alcohol, 10 g of phosphoric acid and 100 mL of water were heated at 90° C. for 5 h, and the cooled down to obtain a polyvinyl alcohol gel;

(6) Two aramid fiber bundles with two-layered coatings of polypyrrole and carbon nanotubes were immersed in a polyvinyl alcohol gel, and then the fibers were taken out and entangled together, the gel was solidified at room temperature to obtain an aramid fiber electrochemical capacitor. Its histograms of length specific capacitance, volume specific capacitance and mass specific capacitance were provided in FIG. 5, its histograms of length energy density, volume energy density and mass energy density are provided in FIG. 6, its retention rates of the capacitance of the aramid fiber electrochemical capacitors after 90° bending at different times are provided in FIG. 8;

Example 1

(1) 0.1 g of dopamine hydrochloride and 0.05 g of trimethylolaminomethane hydrochloride were dissolved in 100 mL of water to obtain solution A; 0.1 g of sodium hydroxide in 100 mL of water was dissolved to obtain an aqueous solution of sodium hydroxide; an aqueous solution of sodium hydroxide was used to adjust the pH value of solution A to 8.5 to obtain solution B; 0.1 g of polyparaphenylene terephthalamide fiber bundles were immersed in solution B, and then the reaction was carried out with shaking at room temperature for 5 hours; after the reaction is complete, the fibers were taken out, washed and dried to obtain polyopamine-coated aramid fiber bundles;

(2) 0.5 g silver nitrate was dissolved in 50 mL water, followed by adding dropwise ammonia water until the silver ammonia solution is clarified again, and the 0.05 g of polyvinylpyrrolidone was added to obtain solution C; 1 g of glucose was dissolved in 50 mL of water to obtain a glucose aqueous solution; 0.1 g of polydopamine-coated aramid fiber bundles was added to solution C, and the solution was shaken at room temperature while the glucose aqueous solution was added dropwise, and then the reaction was processed at room temperature for 10 min with continue shaking; after the reaction, the fibers are taken out, washed and dried to obtain aramid fiber bundles coated with silver nanoparticles.

(3) 0.5 g of γ-(2,3-glycidoxy) propyltrimethoxysilane was added to 100 mL of water, into which 0.1 g of polydopamine and silver nanoparticles coated aramid fiber bundles were then added, the reaction was taken place with shaking at 50° C. for 1 h; after the reaction was completed, the fibers were taken out, washed and dried to obtain aramid fiber bundles coated by silver nanoparticles with epoxy groups on the surface;

(4) 0.5 g of multi-walled carbon nanotubes with carboxyl groups were added to 100 mL of ethanol, and then 0.1 g of aramid fiber bundles coated by silver nanoparticles with epoxy groups on the surface were then added, the reaction was taken place with shaking at 50° C. for 5 h; after the reaction was completed, the fibers were taken out, washed and dried to obtain aramid fiber bundles with double-layered coatings of carbon nanotubes and silver nanoparticles;

(5) 0.2 g silver nitrate was dissolved in 50 mL water to obtain silver nitrate aqueous solution; 0.1 g pyrrole was added into 50 mL water, followed by adding 0.1 g of aramid fiber bundles with double-layered coatings of carbon nanotubes and silver nanoparticles, and then the whole reactor was shaken at room temperature, and silver nitrate water-soluble was added at the same time, and then the reaction was processed at room temperature for 5 hours with shanking; after the reaction was complete, the fibers were taken out, washed and dried to obtain aramid fiber bundles with three-layered coatings of polypyrrole, carbon nanotubes and silver nanoparticles, they are fiber electrodes;

(6) 1 g of polyvinyl alcohol, 1 g of phosphoric acid and 100 mL of water were heated at 50° C. for 1 h, and the cooled down to obtain a polyvinyl alcohol gel; two aramid fiber bundles covered with three-layered coatings of polypyrrole, carbon nanotubes and silver nanoparticles were immersed in a polyvinyl alcohol gel, and then the fibers were taken out and entangled together, the gel was solidified at room temperature to obtain an aramid fiber electrochemical capacitor.

Example 2

(1) 0.2 g of dopamine hydrochloride and 0.16 g of trimethylolaminomethane hydrochloride were dissolved in 100 mL of water to obtain solution A; 2 g of sodium hydroxide in 100 mL of water was dissolved to obtain an aqueous solution of sodium hydroxide; an aqueous solution of sodium hydroxide was used to adjust the pH value of solution A to 8.5 to obtain solution B; 0.5 g of polyparaphenylene terephthalamide fiber bundles were immersed in solution B, and then the reaction was carried out with shaking at room temperature for 24 hours; after the reaction is complete, the fibers were taken out, washed and dried to obtain polyopamine-coated aramid fiber bundles;

(2) 1.5 g silver nitrate was dissolved in 50 mL water, followed by adding dropwise ammonia water until the silver ammonia solution is clarified again, and the 0.25 g of polyvinylpyrrolidone was added to obtain solution C; 3 g of glucose was dissolved in 50 mL of water to obtain a glucose aqueous solution; 0.5 g of polydopamine-coated aramid fiber bundles was added to solution C, and the solution was shaken at room temperature while the glucose aqueous solution was added dropwise, and then the reaction was processed at room temperature for 30 min with continue shaking; after the reaction, the fibers are taken out, washed and dried to obtain aramid fiber bundles coated with silver nanoparticles;

(3) 2.5 g of γ-(2,3-glycidoxy) propyltrimethoxysilane was added to 100 mL of water, into which 0.5 g of polydopamine and silver nanoparticles coated aramid fiber bundles were then added, the reaction was taken place with shaking at 65° C. for 5 h; after the reaction was completed, the fibers were taken out, washed and dried to obtain aramid fiber bundles coated by silver nanoparticles with epoxy groups on the surface;

(4) 1 g of multi-walled carbon nanotubes with carboxyl groups were added to 100 mL of ethanol, and then 0.5 g of aramid fiber bundles coated by silver nanoparticles with epoxy groups on the surface were then added, the reaction was taken place with shaking at 70° C. for 12 h; after the reaction was completed, the fibers were taken out, washed and dried to obtain aramid fiber bundles with double-layered coatings of carbon nanotubes and silver nanoparticles;

(5) 0.42 g of silver nitrate was dissolved in 50 mL water to obtain silver nitrate aqueous solution; 0.34 g pyrrole was added into 50 mL water, followed by adding 0.5 g of aramid fiber bundles with double-layered coatings of carbon nanotubes and silver nanoparticles, and then the whole reactor was shaken at room temperature, and silver nitrate water-soluble was added at the same time, and then the reaction was processed at room temperature for 24 hours with shanking; after the reaction was complete, the fibers were taken out, washed and dried to obtain aramid fiber bundles with three-layered coatings of polypyrrole, carbon nanotubes and silver nanoparticles;

(6) 10 g of polyvinyl alcohol, 10 g of phosphoric acid and 100 mL of water were heated at 90° C. for 5 h, and the cooled down to obtain a polyvinyl alcohol gel;

(7) Two aramid fiber bundles covered with three-layered coatings of polypyrrole, carbon nanotubes and silver nanoparticles were immersed in a polyvinyl alcohol gel, and then the fibers were taken out and entangled together, the gel was solidified at room temperature to obtain an aramid fiber electrochemical capacitor.

Example 3

(1) to (4) are consistent with those in Example 2;

(5) 0.85 g silver nitrate was dissolved in 50 mL water to obtain silver nitrate aqueous solution; 0.67 g pyrrole was added into 50 mL water, followed by adding 0.5 g of aramid fiber bundles with double-layered coatings of carbon nanotubes and silver nanoparticles, and then the whole reactor was shaken at room temperature, and silver nitrate water-soluble was added at the same time, and then the reaction was processed at room temperature for 24 hours with shanking; after the reaction was complete, the fibers were taken out, washed and dried to obtain aramid fiber bundles with three-layered coatings of polypyrrole, carbon nanotubes and silver nanoparticles, they are fiber electrodes;

(6) to (7) are consistent with those in Example 2, and an aramid fiber electrochemical capacitor was obtained.

Figure 1:
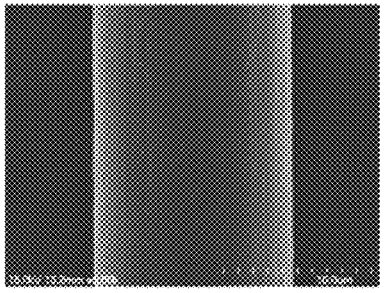
FIG. 1 gives scanning electron microscope (SEM) photographs of poly(p-benzoyl-p-phenylenediamine) fibers, polydopamine-coated poly(p-benzoyl-p-phenylenediamine) fibers, silver nanoparticle-coated poly(p-benzoyl-p-phenylenediamine) fibers, poly(p-benzoyl-p-phenylenediamine) fiber bundles with two-layered coatings of carbon nanotubes and silver nanoparticles, fiber bundles with two-layered coatings of carbon nanotubes and silver nanoparticles, aramid fiber bundles with three-layered coatings of polypyrrole, carbon nanotubes and silver nanoparticles that are provided in Example 3.
Figure 1:
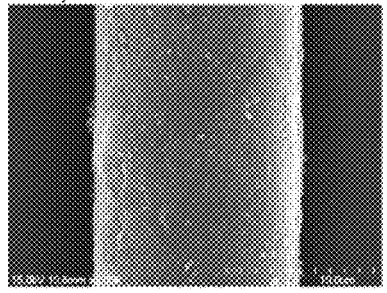
Figure 1:
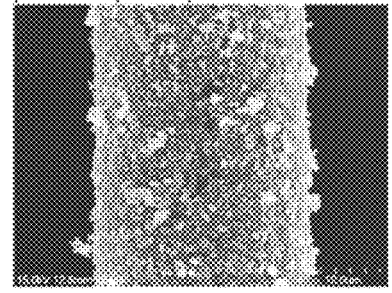
Figure 1:
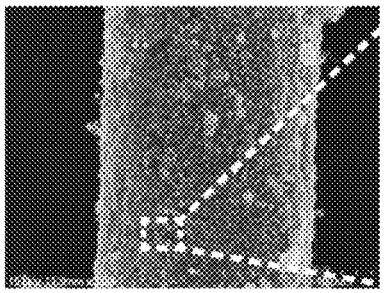
Figure 1:
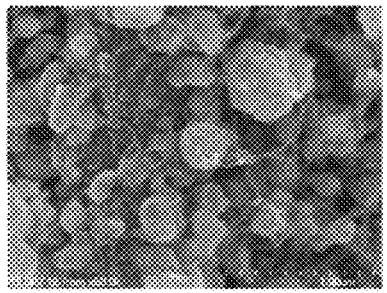
Figure 1:
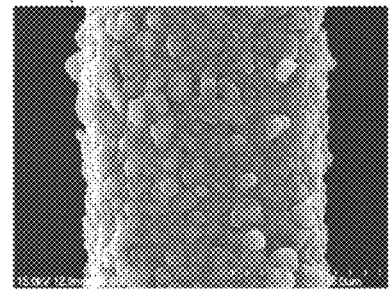

Referring to FIG. 1, it is scanning electron microscope (SEM) photographs of poly-p-phenylene terephthamide fibers, polydopamine-coated aramid fibers, silver nanoparticle-coated aramid fibers, aramid fiber bundles with two-layered coatings of carbon nanotubes and silver nanoparticles, aramid fiber bundles with three-layered coatings of polypyrrole, carbon nanotubes and silver nanoparticles that provided in Example 3. The surface of the poly-p-phenylene terephthamide fiber is smooth; the surface of the aramid fiber covered by polydopamine is rough with a uniform coating layer; the surface of the aramid fiber bundle covered by silver nanoparticles is distributed with silver particles having an average diameter of about 30 nm; there are silver particles and carbon nanotubes on the surface of aramid fibers covered with double-layer coatings of carbon nanotubes and silver nanoparticles; polypyrrole particles with a diameter of about 1 μm were distributed on the surface of aramid fiber bundles with three-layered coatings of polypyrrole, carbon nanotubes and silver nanoparticles.

Figure 2:
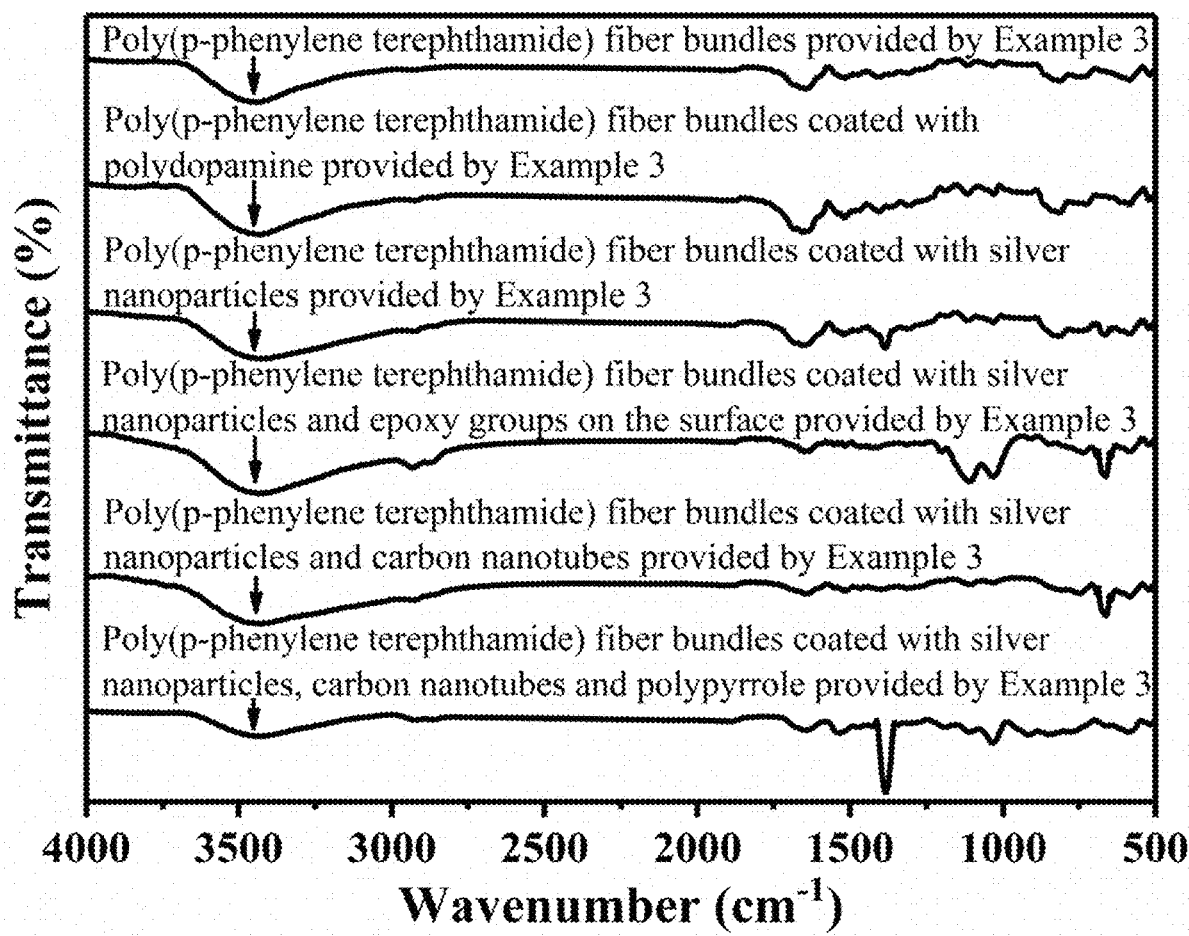
FIG. 2 gives infrared spectra of poly(p-benzoyl-p-phenylenediamine) fibers, polydopamine-coated poly(p-benzoyl-p-phenylenediamine) fibers, silver nanoparticle-coated poly(p-benzoyl-p-phenylenediamine) fibers, poly(p-benzoyl-p-phenylenediamine) fibers coated by silver nanoparticle with epoxy groups, poly(p-benzoyl-p-phenylenediamine) fiber bundles with two-layered coatings of carbon nanotubes and silver nanoparticles, poly(p-benzoyl-p-phenylenediamine) fiber bundles with three-layered coatings of polypyrrole, carbon nanotubes and silver nanoparticles that are provided in Example 3.

FIG. 2 gives infrared spectra of poly-p-phenylene terephthamide fibers, polydopamine-coated aramid fibers, silver nanoparticle-coated aramid fibers, aramid fibers coated by silver nanoparticle with epoxy groups, aramid fiber bundles with two-layered coatings of carbon nanotubes and silver nanoparticles, aramid fiber bundles with three-layered coatings of polypyrrole, carbon nanotubes and silver nanoparticles that provided in Example 3. Compared with the spectrum of poly-p-phenylene terephthamide fibers, that of polydopamine-coated aramid fibers shows absorption peaks assigning to asymmetric (2929 $cm^{-1}$) and symmetric (2851 cm$^{-1}$) stretching vibration of methylene that are derived from polydopamine. Compared with the spectrum of silver nanoparticle-coated aramid fibers, that of aramid fibers coated by silver nanoparticles with epoxy groups have characteristic peaks reflecting asymmetric stretching vibration (845 and 908 cm$^{-1}$) of epoxy group, stretching vibrations of Si—O—C (1034 cm$^{-1}$), Si—O (1110 cm$^{-1}$) and Si—CH$_2$—R (1200 cm$^{-1}$), these peaks belong to γ-(2,3-glycidoxy) propyltrimethoxysilane. The characteristic peaks of epoxy group are not found in the spectrum of aramid fibers coated with multi-walled carbon nanotubes and silver particles. In the spectrum of aramid fiber bundles with three-layered coatings of polypyrrole, carbon nanotubes and silver nanoparticles, there are characteristic peaks from polypyrrole including the in-plane vibration of C—H (1033 cm$^{-1}$), stretching vibration of C—C (1533 cm$^{-1}$) and stretching vibration of C—N (1430 cm$^{-1}$).[36] The strong peak at 1385 cm$^{-1}$ is originated from the interaction between silver nanoparticles and polypyrrole.

Figure 3:
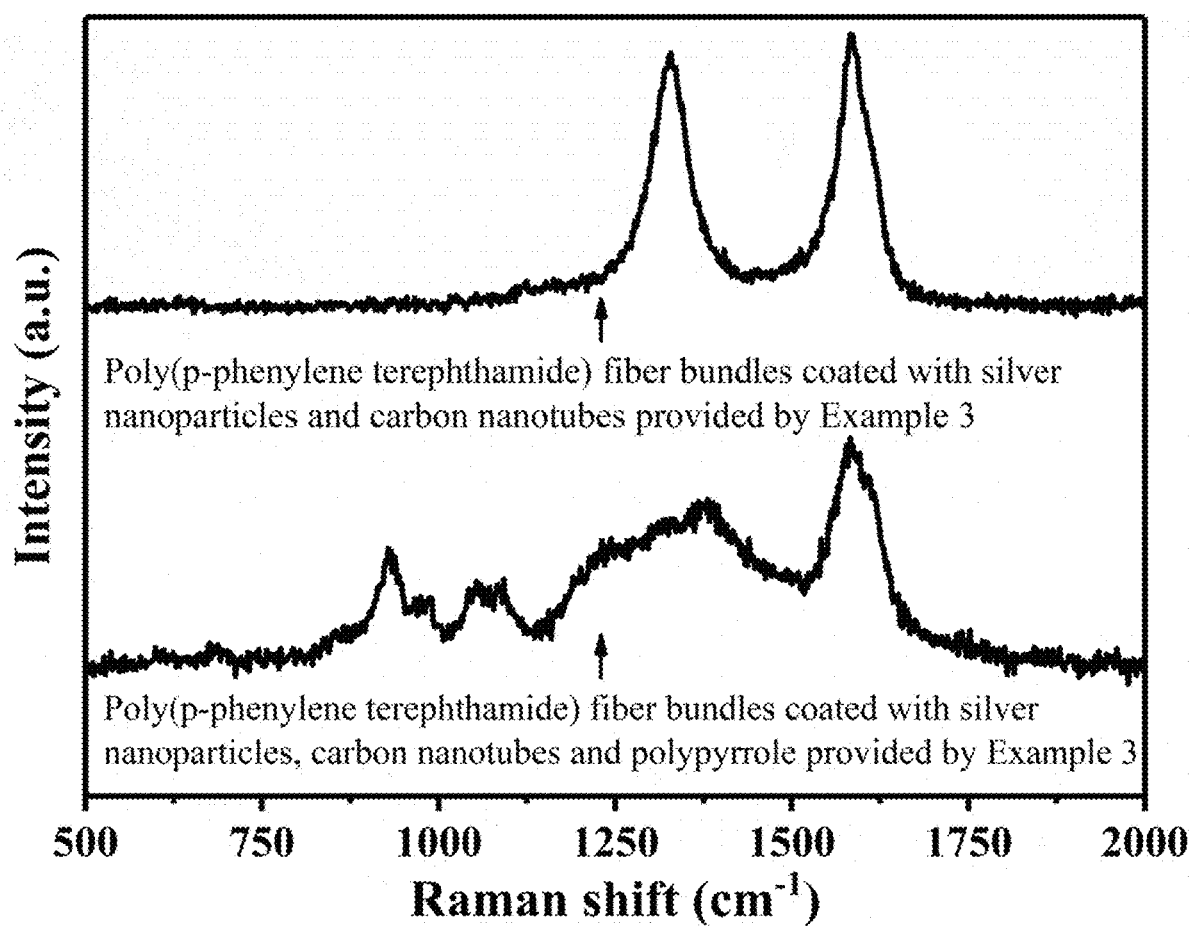
FIG. 3 shows Raman spectra of poly(p-benzoyl-p-phenylenediamine) fiber bundles with two-layered coatings of carbon nanotubes and silver nanoparticles as well as poly(p-benzoyl-p-phenylenediamine) fiber bundles with three-layered coatings of polypyrrole, carbon nanotubes and silver nanoparticles that are provided in Example 3.

FIG. 3 shows Raman spectra of poly-p-phenylene terephthamide fiber bundles with three-layered coatings of polypyrrole, carbon nanotubes and silver nanoparticles, aramid fiber bundles with two-layered coatings of carbon nanotubes and silver nanoparticles that are provided in Example 3. The spectrum of aramid fibers with double-layered coatings consists of two characteristic bands of carbonaceous materials, namely D-band at ca. 1329 cm$^{-1}$ and G-band at ca. 1583 cm$^{-1}$; the spectrum of aramid fibers with three-layered coatings show the peaks at ca. 1000-1150 cm$^{-1}$, 1300-1410 cm$^{-1}$ and 1600 cm$^{-1}$, they are attributed to the in-plane deformation of C—H, ring stretching and C=C backbone stretching of polypyrrole, respectively, demonstrating the presence of polypyrrole coating on fibres.

Figure 4:
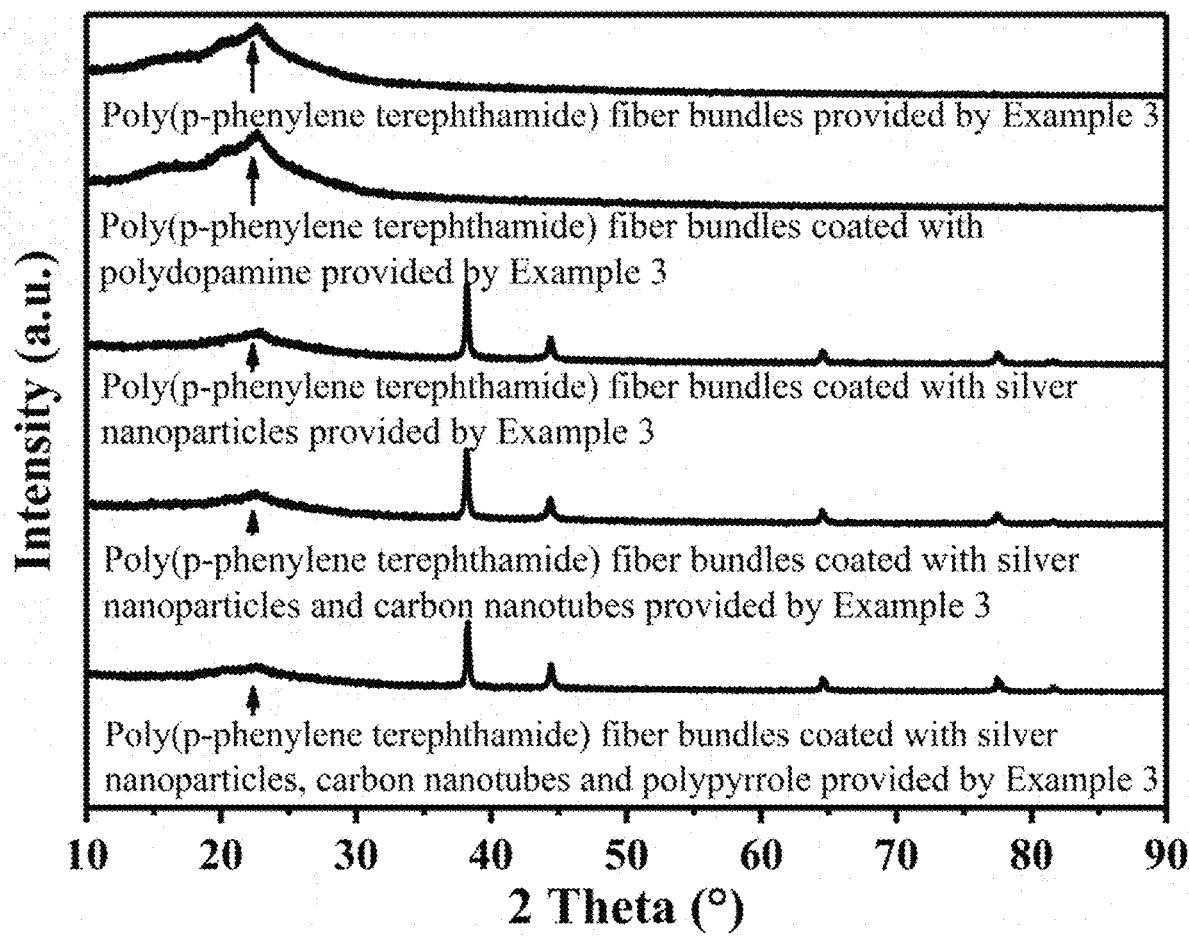
FIG. 4 gives X-ray diffraction patterns of poly(p-benzoyl-p-phenylenediamine) fibers, polydopamine-coated poly(p-benzoyl-p-phenylenediamine) fibers, silver nanoparticle-coated poly(p-benzoyl-p-phenylenediamine) fibers, poly(p-benzoyl-p-phenylenediamine) fiber bundles with two-layered coatings of carbon nanotubes and silver nanoparticles as well as poly(p-benzoyl-p-phenylenediamine) fiber bundles with three-layered coatings of polypyrrole, carbon nanotubes and silver nanoparticles that are provided in Example 3.

FIG. 4 gives X-ray diffraction patterns of poly-p-phenylene terephthamide fibers, polydopamine-coated aramid fibers, silver nanoparticle-coated aramid fibers, aramid fiber bundles with two-layered coatings of carbon nanotubes and silver nanoparticles as well as aramid fiber bundles with three-layered coatings of polypyrrole, carbon nanotubes and silver nanoparticles that are provided in Example 3. Each pattern shows a broad peak superimposed by (110) and (200) peaks, the typical peaks of poly-p-phenylene terephthamide fibers, indicating that the crystal structure of aramid fibre is not changed in the whole process of preparing new fibres. Compared with the patterns of poly-p-phenylene terephthamide and polydopamine-coated aramid fibers, those of silver nanoparticle-coated aramid fibers, aramid fiber bundles with two-layered coatings and aramid fiber bundles with three-layered coatings show peaks reflecting (111), (200), (220), (311) and (222) planes, which result from face-centred-cubic phase of Ag, so the appearance of these peaks demonstrate the production of silver coating on fibres.

Figure 5:
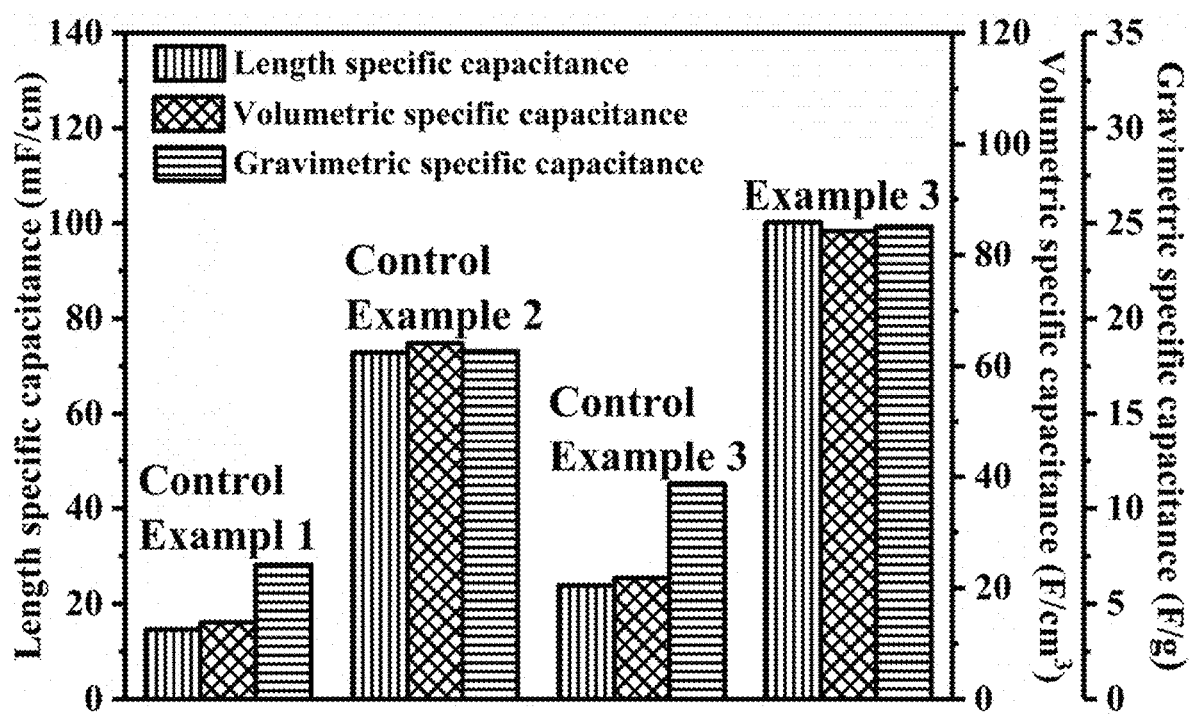
FIG. 5 gives histograms of the length, volumetric and gravimetric specific capacitances of the aramid fiber electrochemical capacitors provided in Comparative Example 1, Comparative Example 2, Comparative Example 3, and Example 3.

FIG. 5 gives histograms of the length, volumetric and gravimetric specific capacitance of the aramid fiber electrochemical capacitors provided in Comparative Example 1, Comparative Example 2, Comparative Example 3, and Example 3. The aramid fiber electrochemical capacitor prepared in Example 3 has the optimal capacitance performance, its length specific capacitance, volume specific capacitance and mass specific capacitance are 100.1 mF/cm, 84.3 F/cm$^3$, and 24.8 F/g, respectively; moreover, the specific capacitances are all higher than their theoretical values ($C_{Comparative\ Example\ 2} + C_{Comparative\ Example\ 3} - 2C_{Comparative\ Example\ 1}$, where C is the specific capacitance determined experimentally), indicating that there is a synergistic effect between silver and carbon nanotubes, this may be because carbon nanotubes fill the gaps between silver particles, a better conductive network is formed, and thus increasing the conductivity of the electrode.

Figure 6:
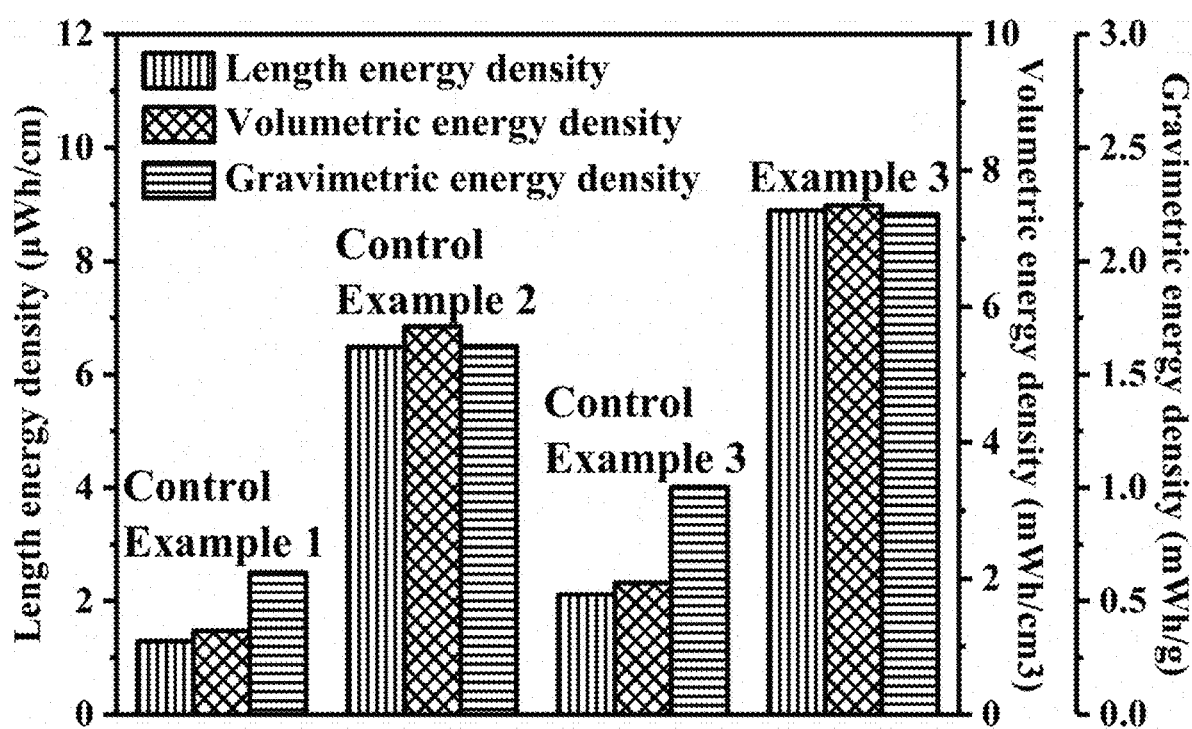
FIG. 6 gives histograms of length, volumetric and gravimetric energy densities of the aramid fiber electrochemical capacitors provided by Comparative Example 1, Comparative Example 2, Comparative Example 3, and Example 3.

FIG. 6 gives histograms of length, volumetric and gravimetric energy densities of the aramid fiber electrochemical capacitors provided by Comparative Example 1, Comparative Example 2, Comparative Example 3, and Example 3. As energy density is proportional to specific capacitance, it has a similar law to the specific capacitance. That is, the aramid fiber electrochemical capacitor prepared in Example 3 has the highest energy density, and its length, volumetric and gravimetric energy densities are 8.9 μWh/cm, 7.49 mWh/m$^3$, and 2.21 mWh/g.

Referring to Table 1, it is the aramid fiber electrochemical capacitor prepared in Example 3 of the present invention and the aramid fiber electrochemical capacitor prepared in Comparative Example 1, Comparative Example 2, and Comparative Example 3 after 1000 cycles of voltammetry. Aramid fiber electrochemical capacitor prepared in Comparative Example 1 has the minimum capacitance, those in Comparative Examples 2 and 3 have slightly improved cycle performances, while that in Example 3 has the best. This is because swelling and shrinkage generally occur when polypyrrole contacts with electrolyte during cycling, and the presence of silver particles and carbon nanotubes can prevent the structure of the polypyrrole from being destroyed, thereby improving the cycling performance. In the existing reports, the capacitance retention rate of polymer fiber capacitors containing conductive polymers after 1000 cycles is generally below 92%, and the capacitance retention rate after 1000 cycles of aramid fiber electrochemical capacitor prepared in Example 3 of the present invention reached 95.2%.

TABLE 1

| Capacitance retention ratios of Example 3 and Comparative Examples 1 to 3 | | | | |
|---|---|---|---|---|
| | Comparative Example 1 | Comparative Example 2 | Comparative Example 3 | Example 3 |
| Capacitance retention rate (%) | 88.1 | 90.8 | 91.0 | 95.2 |

Figure 7:
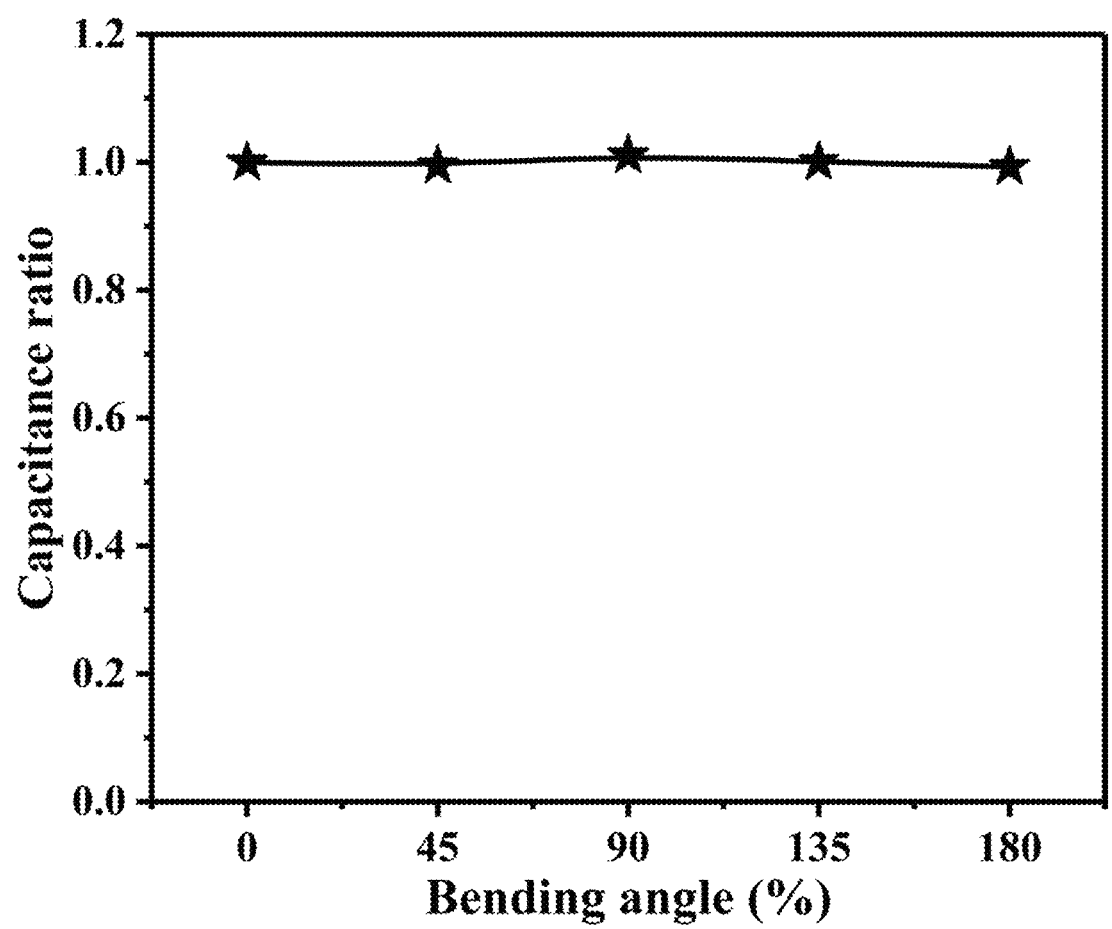
FIG. 7 is the ratios of the capacitance of the aramid fiber electrochemical capacitor provided in Example 3 to the initial capacitance at different bending angles.

FIG. 7 is the ratios of the capacitance of the aramid fiber electrochemical capacitor provided in Example 3 to the initial capacitance at different bending angles. Even if the bending angle of the aramid fiber capacitor reaches 180°, its capacitance has only slight change, indicating that the aramid fiber capacitor has good flexibility.

Figure 9:
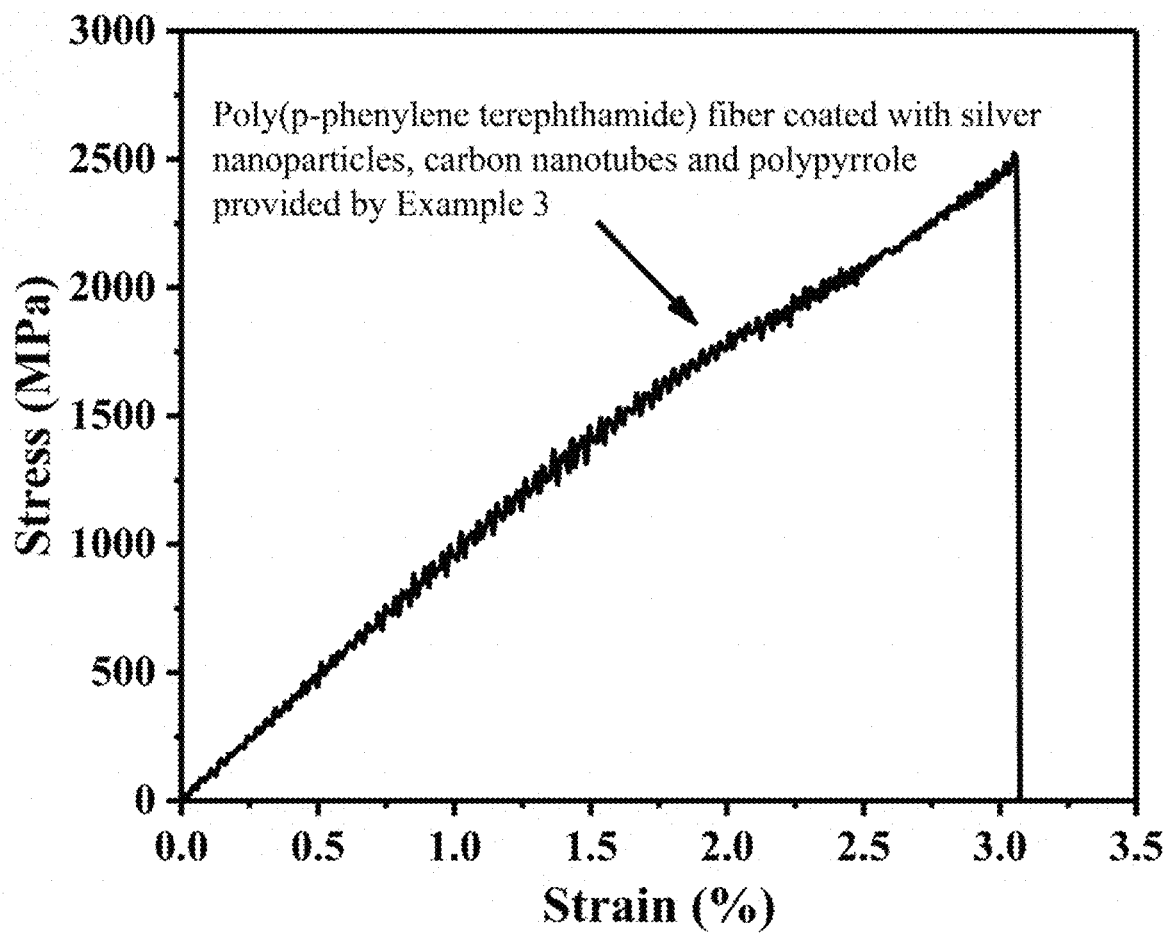
FIG. 9 gives the stress-strain curve of aramid fiber bundles with three-layered coatings of polypyrrole, carbon nanotubes and silver nanoparticles that are provided in Example 3.

FIG. 8 is the retention rates of the capacitance of the aramid fiber electrochemical capacitors after 90° bending at different times provided by Comparative Example 1, Comparative Example 2, Comparative Example 3, and Example 3. When the number of bending times reaches 500, the capacitance retention rate of the aramid fiber capacitor is 94.5%, which is higher than those of Comparative Example 1 (78.8%), Comparative Example 2 (82.2%), and Comparative Example 3 (87.1%), indicating good adhesion between the coating layers FIG. 9 gives the stress-strain curve of aramid fiber bundles with three-layered coatings of polypyrrole, carbon nanotubes and silver nanoparticles that are provided in Example 3. The elongation at break, tensile strength and modulus are 3.1%, 2521 MPa and 95.4 GPa, respectively, indicating that aramid fibers coated with three-layers have good mechanical properties. Tensile strength and modulus of aramid fiber prepared in Comparative Example 3 are 2232

MPa and 81.9 GPa, respectively, while those of fibers prepared in Comparative Examples 1 and 2 are lower.

Example 4

(1) 0.2 g of dopamine hydrochloride and 0.16 g of trimethylolaminomethane hydrochloride were dissolved in 100 mL of water to obtain solution A; 2 g of sodium hydroxide in 100 mL of water was dissolved to obtain an aqueous solution of sodium hydroxide; an aqueous solution of sodium hydroxide was used to adjust the pH value of solution A to 8.5 to obtain solution B; 0.5 g of polyparaphenylene terephthalamide fiber bundles were immersed in solution B, and then the reaction was carried out with shaking at room temperature for 24 hours; after the reaction is complete, the fibers were taken out, washed and dried to obtain polyopamine-coated aramid fiber bundles;

(2) 1.5 g silver nitrate was dissolved in 50 mL water, followed by adding dropwise ammonia water until the silver ammonia solution is clarified again, and the 0.25 g of polyvinylpyrrolidone was added to obtain solution C; 3 g of glucose was dissolved in 50 mL of water to obtain a glucose aqueous solution; 0.5 g of polydopamine-coated aramid fiber bundles was added to solution C, and the solution was shaken at room temperature while the glucose aqueous solution was added dropwise, and then the reaction was processed at room temperature for 30 min with continue shaking; after the reaction, the fibers are taken out, washed and dried to obtain aramid fiber bundles coated with silver nanoparticles.

(3) 2.5 g of γ-(2,3-glycidoxy) propyltrimethoxysilane was added to 100 mL of water, into which 0.5 g of polydopamine and silver nanoparticles coated aramid fiber bundles were then added, the reaction was taken place with shaking at 65° C. for 5 h; after the reaction was completed, the fibers were taken out, washed and dried to obtain aramid fiber bundles with epoxy groups on the surface;

(4) 1 g of multi-walled carbon nanotubes with carboxyl groups were added to 100 mL of ethanol, and then 0.5 g of aramid fiber bundles coated by silver nanoparticles with epoxy groups on the surface were then added, the reaction was taken place with shaking at 70° C. for 12 h; after the reaction was completed, the fibers were taken out, washed and dried to obtain aramid fiber bundles with double-layered coatings of carbon nanotubes and silver nanoparticles;

(5) 1.27 g silver nitrate was dissolved in 50 mL water to obtain silver nitrate aqueous solution; 1.01 g pyrrole was added into 50 mL water, followed by adding 0.5 g of aramid fiber bundles with double-layered coatings of carbon nanotubes and silver nanoparticles, and then the whole reactor was shaken at room temperature, and silver nitrate water-soluble was added at the same time, and then the reaction was processed at room temperature for 24 hours with shanking; after the reaction was complete, the fibers were taken out, washed and dried to obtain aramid fiber bundles with three-layered coatings of polypyrrole, carbon nanotubes and silver nanoparticles;

(6) 10 g of polyvinyl alcohol, 10 g of phosphoric acid and 100 mL of water were heated at 90° C. for 5 h, and the cooled down to obtain a polyvinyl alcohol gel;

(7) two aramid fiber bundles covered with three-layered coatings of polypyrrole, carbon nanotubes and silver nanoparticles were immersed in a polyvinyl alcohol gel, and then the fibers were taken out and entangled together, the gel was solidified at room temperature to obtain an aramid fiber electrochemical capacitor. After 1000 cycles, the capacitance retention rate reaches 95.1%, when the number of bending times reaches 500, the capacitance retention rate of aramid fiber capacitors is 94.1%.

Example 5

(1) 1 g of dopamine hydrochloride and 0.5 g of trimethylolaminomethane hydrochloride were dissolved in 100 mL of water to obtain solution A; 10 g of sodium hydroxide in 100 mL of water was dissolved to obtain an aqueous solution of sodium hydroxide; an aqueous solution of sodium hydroxide was used to adjust the pH value of solution A to 8.5 to obtain solution B; 1 g of polyparaphenylene terephthalamide fiber bundles were immersed in solution B, and then the reaction was carried out with shaking at room temperature for 48 hours; after the reaction is complete, the fibers were taken out, washed and dried to obtain polyopamine-coated aramid fiber bundles;

(2) 5 g silver nitrate was dissolved in 50 mL water, followed by adding dropwise ammonia water until the silver ammonia solution is clarified again, and the 0.5 g of polyvinylpyrrolidone was added to obtain solution C; 10 g of glucose was dissolved in 50 mL of water to obtain a glucose aqueous solution; 1 g of polydopamine-coated aramid fiber bundles was added to solution C, and the solution was shaken at room temperature while the glucose aqueous solution was added dropwise, and then the reaction was processed at room temperature for 60 min with continue shaking; after the reaction, the fibers are taken out, washed and dried to obtain aramid fiber bundles coated with silver nanoparticles.

(3) 5 g of γ-(2,3-glycidoxy) propyltrimethoxysilane was added to 100 mL of water, into which 1 g of polydopamine and silver nanoparticles coated aramid fiber bundles were then added, the reaction was taken place with shaking at 100° C. for 10 h; after the reaction was completed, the fibers were taken out, washed and dried to obtain aramid fiber bundles with epoxy groups on the surface;

(4) 5 g of multi-walled carbon nanotubes with carboxyl groups were added to 100 mL of ethanol, and then 1 g of aramid fiber bundles coated by silver nanoparticles with epoxy groups on the surface were then added, the reaction was taken place with shaking at 80° C. for 24 h; after the reaction was completed, the fibers were taken out, washed and dried to obtain aramid fiber bundles with double-layered coatings of carbon nanotubes and silver nanoparticles;

(5) 4 g silver nitrate was dissolved in 50 mL water to obtain silver nitrate aqueous solution; 2 g pyrrole was added into 50 mL water, followed by adding 1 g of aramid fiber bundles with double-layered coatings of carbon nanotubes and silver nanoparticles, and then the whole reactor was shaken at room temperature, and silver nitrate water-soluble was added at the same time, and then the reaction was processed at room temperature for 48 hours with shanking; after the reaction was complete, the fibers were taken out, washed and dried to obtain aramid fiber bundles with three-layered coatings of polypyrrole, carbon nanotubes and silver nanoparticles;

(6) 20 g of polyvinyl alcohol, 20 g of phosphoric acid and 100 mL of water were heated at 100° C. for 10 h, and the cooled down to obtain a polyvinyl alcohol gel;

(7) two aramid fiber bundles covered with three-layered coatings of polypyrrole, carbon nanotubes and silver nanoparticles were immersed in a polyvinyl alcohol gel, and then the fibers were taken out and entangled together, the gel was solidified at room temperature to obtain an aramid fiber electrochemical capacitor. After 1000 cycles, the capacitance retention rate reaches 95.0%, when the number of bending times reaches 500, the capacitance retention rate of aramid fiber capacitors is 94.2%.

The invention claimed is:
1. A method for preparing an aramid fiber electrode, comprising the following steps:
   (1) immersing aramid fiber bundles in an aqueous solution containing dopamine hydrochloride and trimethylolaminomethane hydrochloride to obtain polydopamine-coated aramid fiber bundles;
   (2) adding polyvinylpyrrolidone into a silver ammonia solution to obtain a solution C; adding the polydopamine-coated aramid fiber bundles into the solution C, followed by adding dropwise an aqueous glucose solution to obtain aramid fiber bundles coated with silver nanoparticles;
   (3) adding the aramid fiber bundles coated with silver nanoparticles into an aqueous solution containing (3-glycidoxypropyl)trimethoxysilane to get aramid fiber bundles coated by silver nanoparticles with epoxy groups on a surface thereof;
   (4) adding the aramid fiber bundles coated by silver nanoparticles with epoxy groups on the surface into ethanol containing carbon nanotubes with carboxyl groups to obtain aramid fiber bundles with double-layered coatings of carbon nanotubes and silver nanoparticles;
   (5) adding the aramid fiber bundles with double-layered coatings of carbon nanotubes and silver nanoparticles into an aqueous solution containing pyrrole, and then adding dropwise a silver nitrate aqueous solution to obtain the aramid fiber electrode.

2. The method according to claim 1, wherein in step (1), the mass ratio of dopamine hydrochloride, trimethylolaminomethane hydrochloride and aramid fiber bundles is (0.1-1):(0.05-0.5):(0.1-1); in step (2), the silver ammonia solution comprises silver nitrate, and the mass ratio of silver nitrate, polyvinylpyrrolidone, glucose and the polydopamine coated aramid fiber bundles is (0.5-5):(0.05-0.5):(1-10):(0.1-1); in step (3), the mass ratio of (3-glycidoxypropyl)trimethoxysilane and the aramid fiber bundles coated with silver nanoparticles is (0.5-5):(0.1-1); in step (4), the mass ratio of the carbon nanotubes with carboxyl groups to the aramid fiber bundles coated with silver nanoparticles containing epoxy groups is (0.5-5):(0.1-1).

3. The method according to claim 1, wherein in step (1), a pH value of the aqueous solution containing dopamine hydrochloride and trimethylolaminomethane hydrochloride is 8.5, a reaction of the aramid fiber bundles, dopamine hydrochloride and trimethylolaminomethane hydrochloride is carried out with shaking at room temperature for 5 to 48 hours; in step (2), a reaction of the polydopamine-coated aramid fiber bundles, the solution C, and the aqueous glucose solution is a shaking reaction at room temperature for 10 to 60 min; in step (3), a reaction of the aramid fiber bundles coated with silver nanoparticles and (3-glycidoxypropyl)trimethoxysilane is a shaking reaction at 50 to 100° C. for 1 to 10 hours; in step (4), a reaction of the aramid fiber bundles coated by silver nanoparticles with epoxy groups on the surface and carbon nanotubes with carboxyl groups is a shaking reaction at 50 to 80° C. for 5 to 24 hours.

4. The method according to claim 1, wherein the aramid fiber bundles include polyparaphenylene terephthalamide fiber, isophthaloyl metaphenylene diamine fibers, polyparabenamide fibers, or a combination thereof; and the carbon nanotubes include multi-walled carbon nanotubes, single-walled carbon nanotubes, carbon nanotube bundles, or a combination thereof.

5. The method according to claim 1, wherein in step (5), the mass ratio of silver nitrate, pyrrole, and the aramid fiber bundles with double-layered coatings of carbon nanotubes and silver nanoparticles is (0.2-4):(0.1-2):(0.1-1); a reaction of silver nitrate, pyrrole, and the aramid fiber bundles with double-layered coatings of carbon nanotubes and silver nanoparticles is carried out at room temperature for 5 to 48 hours with shaking.

6. Aramid fiber electrode prepared according to the preparation method of claim 1.

7. A method for preparing aramid fiber bundles with double-layered coatings of carbon nanotubes and silver nanoparticles, comprising the following steps:
   (1) immersing aramid fiber bundles in an aqueous solution containing dopamine hydrochloride and trimethylolaminomethane hydrochloride to obtain polydopamine-coated aramid fiber bundles;
   (2) adding polyvinylpyrrolidone into a silver ammonia solution to obtain a solution C; adding the polydopamine-coated aramid fiber bundles into the solution C, followed by adding dropwise an aqueous glucose solution to obtain aramid fiber bundles coated with silver nanoparticles;
   (3) adding the aramid fiber bundles coated with silver nanoparticles into an aqueous solution containing (3-glycidoxypropyl)trimethoxysilane to get aramid fiber bundles coated by silver nanoparticles with epoxy groups on a surface thereof;
   (4) adding the aramid fiber bundles coated by silver nanoparticles with epoxy groups on the surface into ethanol containing carbon nanotubes with carboxyl groups to obtain aramid fiber bundles with double-layered coatings of carbon nanotubes and silver nanoparticles.

8. The method according to claim 7, wherein in step (1), the mass ratio of dopamine hydrochloride, trimethylolaminomethane hydrochloride and aramid fiber bundles is (0.1-1):(0.05-0.5):(0.1-1); in step (2), the silver ammonia solution comprises silver nitrate, and the mass ratio of silver nitrate, polyvinylpyrrolidone, glucose and the polydopamine coated aramid fiber bundles is (0.5-5):(0.05-0.5):(1-10):(0.1-1); in step (3), the mass ratio of (3-glycidoxypropyl)trimethoxysilane and the aramid fiber bundles coated with silver nanoparticles is (0.5-5):(0.1-1); in step (4), the mass ratio of the carbon nanotubes with carboxyl groups to the aramid fiber bundles coated with silver nanoparticles containing epoxy groups is (0.5-5):(0.1-1).

9. The method according to claim 7, wherein in step (1), a pH value of the aqueous solution containing dopamine hydrochloride and trimethylolaminomethane hydrochloride is 8.5, a reaction of the aramid fiber bundles, dopamine hydrochloride and trimethylolaminomethane hydrochloride is carried out with shaking at room temperature for 5 to 48 hours; in step (2), a reaction of the polydopamine-coated aramid fiber bundles, the solution C, and the aqueous glucose solution is a shaking reaction at room temperature for 10 to 60 min; in step (3), a reaction of the aramid fiber bundles coated with silver nanoparticles and (3-glycidoxypropyl)trimethoxysilane is a shaking reaction at 50 to 100° C. for 1 to 10 hours; in step (4), a reaction of the aramid fiber bundles coated by silver nanoparticles with epoxy groups on the surface and carbon nanotubes with carboxyl groups is a shaking reaction at 50 to 80° C. for 5 to 24 hours.

10. The method according to claim 7, wherein the aramid fiber bundles are polyparaphenylene terephthalamide fiber, isophthaloyl metaphenylene diamine fibers, polyparabenamide fibers, or a combination thereof; and the carbon nanotubes include multi-walled carbon nanotubes, single-walled carbon nanotubes, carbon nanotube bundles, or a combination thereof.

11. Aramid fiber bundles with double-layered coatings of carbon nanotubes and silver nanoparticles prepared according to the preparation method of claim 7.

* * * * *